(12) United States Patent
Oza

(10) Patent No.: US 7,654,686 B2
(45) Date of Patent: Feb. 2, 2010

(54) LUMINAIRE HAVING AN APERATURE LIGHT PATH

(75) Inventor: Napoli Oza, Peabody, MA (US)

(73) Assignee: Osram Sylvania Inc., Danvers, MA (US)

( * ) Notice: Subject to any disclaimer, the term of this patent is extended or adjusted under 35 U.S.C. 154(b) by 147 days.

(21) Appl. No.: 11/940,556

(22) Filed: Nov. 15, 2007

(65) Prior Publication Data

US 2009/0129072 A1      May 21, 2009

(51) Int. Cl.
*F21V 9/00*      (2006.01)
*F21V 15/00*     (2006.01)
*F21V 21/00*     (2006.01)

(52) U.S. Cl. ............. 362/231; 362/249.01; 362/249.02; 362/365

(58) Field of Classification Search ................. 362/559, 362/576, 365, 366, 367, 249.01, 249.02, 362/231, 373

See application file for complete search history.

(56) References Cited

U.S. PATENT DOCUMENTS

| 4,787,689 | A | 11/1988 | Korotky et al. |
| 6,971,781 | B2 * | 12/2005 | Guy ........................... 362/576 |
| 2004/0105261 | A1 | 6/2004 | Ducharme et al. |
| 2006/0018118 | A1 | 1/2006 | Lee et al. |
| 2006/0203488 | A1 | 9/2006 | Lodhie |
| 2007/0145915 | A1 | 6/2007 | Roberge et al. |

FOREIGN PATENT DOCUMENTS

WO      2006/036657 A2      4/2006

\* cited by examiner

*Primary Examiner*—John A Ward
(74) *Attorney, Agent, or Firm*—Shaun P. Montana

(57) ABSTRACT

A luminaire comprising an output aperture having an input port and an output port, a radiation guide having an input port and an output port and an array of LEDs located at the input port of the guide. Light emitted by the LEDs is transmitted into the guide. The input port of the aperture operatively connects to the output port of guide and is positioned adjacent thereto so that a central plane of the output aperture is asymmetric relative to a central plane of the radiation guide.

28 Claims, 17 Drawing Sheets

US 7,654,686 B2

LUMINAIRE HAVING AN APERATURE LIGHT PATH

BACKGROUND

The present invention generally relates to light luminaires and, in particular, light luminaires for illuminating a planar area such as a wall or a painting on a wall.

Illuminating a planar area presents many challenges, particularly when the luminaire is intended to be mounted adjacent a side of a planar area to be illuminated rather than centered immediately over the area. The light illuminating the planar area should be generated by a plurality of light sources presenting different wavelength content. The intensity of light produced by each of the sources should be controllable to create different lighting modes. The light illuminating the planar area should be mixed well so that the planar area is uniformly illuminated and color shadows are minimized. The light illuminating the planar area should have a degree of uniformity; the angular output should be such that sections of the planar area farther from the output port of the luminaires are illuminated with similar intensity as sections of the planar area nearer to the output port of the luminaires. The luminaires should be compact and configured to be located adjacent a periphery of the planar area to minimize blocking the view of the planar area, which is usually being illuminated so that it can be viewed.

There is a need for luminaires which address the above challenges as well as other challenges.

SUMMARY OF THE INVENTION

In one form, the invention comprises a luminaire including an array of LEDs transmitting light via a radiation guide that has an asymmetric output section to shape the beam. The output aperture is asymmetric relative to the input section of the radiation guide.

Other objects and features will be in part apparent and in part pointed out hereinafter.

BRIEF DESCRIPTION OF THE DRAWINGS

FIG. 6 illustrates optical spectral data in wavelength vs. watts/nm in a dim candlelight mode (~1950K) with a CRI=87.7, of one embodiment of the invention operating in a dim candlelight mode without a diffuser at its output aperture and compared to actual candlelight.

FIG. 7 illustrates optical spectral data in wavelength vs. watts/nm in a bright candlelight mode (~2800K) with a CRI=92.7, of one embodiment of the invention operating in a bright candlelight mode without a diffuser at its output aperture and compared to actual candlelight.

FIG. 8 illustrates optical spectral data in wavelength vs. watts/nm in a dawn/dusk mode (~3300K) with a CRI=93.7, of one embodiment of the invention operating in a dawn/dusk mode without a diffuser at its output aperture and compared to actual dawn/dusk lighting.

FIG. 9 illustrates optical spectral data in wavelength vs. watts/nm in a moonlight mode (~4700K) with a CRI=95.3, of one embodiment of the invention operating in a moonlight mode without a diffuser at its output aperture and compared to actual moonlight.

FIG. 10 illustrates optical spectral data in wavelength vs. watts/nm in a sunny day mode (~5500K) with a CRI=95.3, of one embodiment of the invention operating in a sunny day mode without a diffuser at its output aperture and compared to actual sunny day lighting.

FIG. 11 illustrates optical spectral data in wavelength vs. watts/nm in a blue sky with sun mode (~6500K) with a CRI=91.4, of one embodiment of the invention operating in a blue sky with sun mode without a diffuser at its output aperture and compared to actual blue sky with sun lighting.

Corresponding reference characters indicate corresponding parts throughout the drawings.

BRIEF DESCRIPTION OF THE TABLES

Tables 7-11 represent values measured when semi-glossy white paint inside the radiation guide is used. It is contemplated that the numbers for color uniformity can be improved by various design choices.

Table 7 illustrates the uniformity of illuminating at 1994 K based on a 3.5'×3.5' painting at a distance of 18" from the top surface (see FIG. 4B) of the painting to the center of the luminaire having a light diffuser at its output aperture.

Table 8 illustrates the uniformity of illuminating at 3300 K a 3.5'×3.5' painting at a distance of 18" from the top surface (see FIG. 4B) of the painting to the center of the luminaire having a light diffuser at its output aperture.

Table 9 illustrates the uniformity of illuminating at 4700 K a 3.5'×3.5' painting at a distance of 18" from the top surface (see FIG. 4B) of the painting to the center of the luminaire having a light diffuser at its output aperture.

Table 10 illustrates the uniformity of illuminating at 5500 K a 3.5'×3.5' painting at a distance of 18" from the top surface (see FIG. 4B) of the painting to the center of the luminaire having a light diffuser at its output aperture.

Table 11 illustrates the uniformity of illuminating at 6500 K a 3.5'×3.5' painting at a distance of 18" from the top surface (see FIG. 4B) of the painting to the center of the luminaire having a light diffuser at its output aperture.

Table 12 illustrates the power consumption vs. color settings at stabilization with diffuser but minimal driver board cooling. In general, the LEDs do not have to be driven at maximum field intensity.

Table 13 illustrates one example of the lumens on a painting according to the invention.

Table 14 illustrates the illuminance on a painting indicating uniformity.

Table 15 illustrates illuminance and color uniformity.

Table 16 illustrates one configuration of the LEDs.

DETAILED DESCRIPTION

Figure 1:
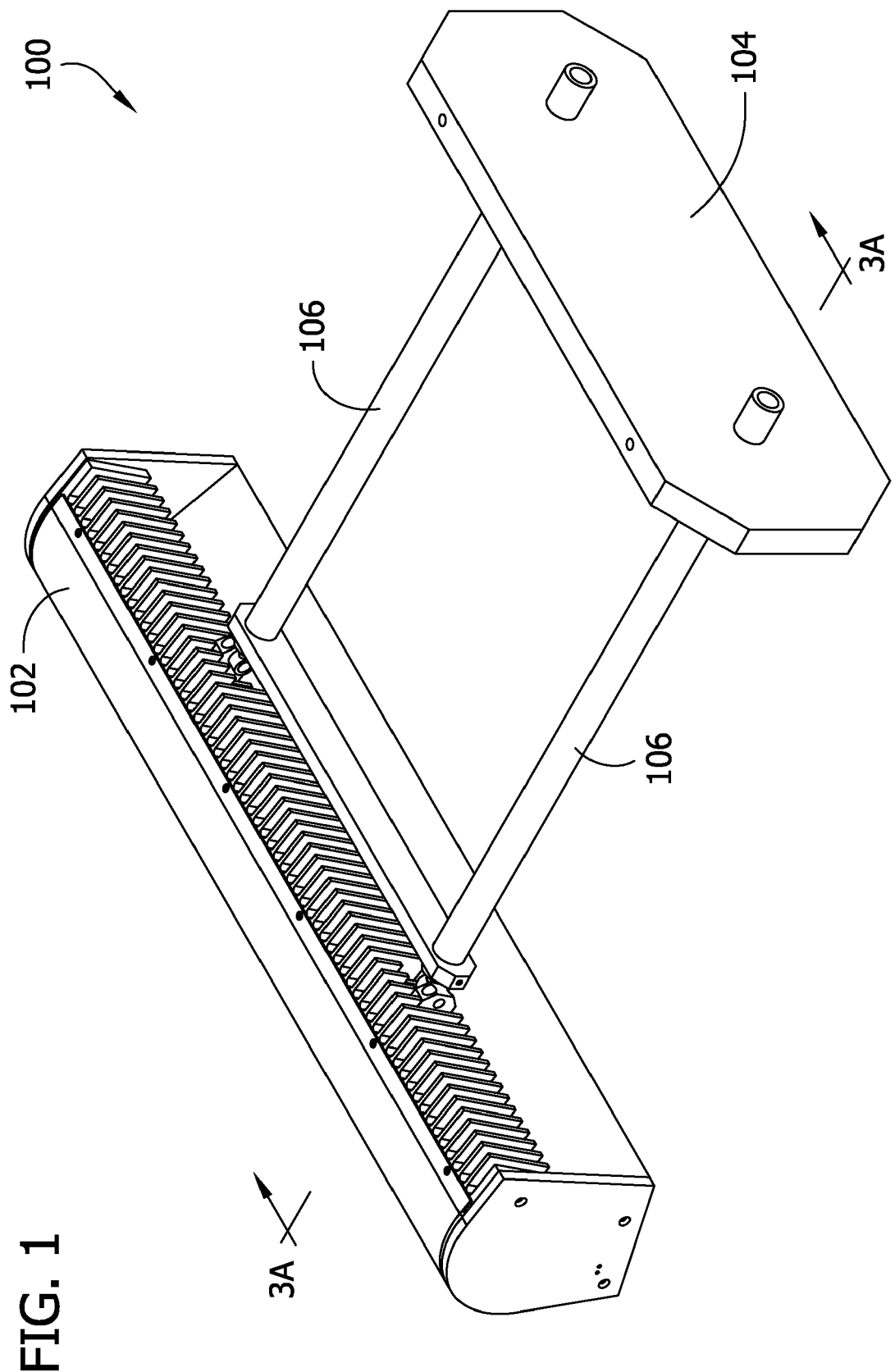
FIG. 1 is a perspective view of a luminaire according to one embodiment of the invention.

Referring to FIG. 1, a perspective view of a luminaire 100 according to one embodiment of the invention is illustrated. A light fixture 102 is mounted to a base which may be attached to a wall being illuminated or to a surface supporting a painting to be illuminated. One or more supports 106 affix the light fixture 102 to the base 104.

Figure 2:
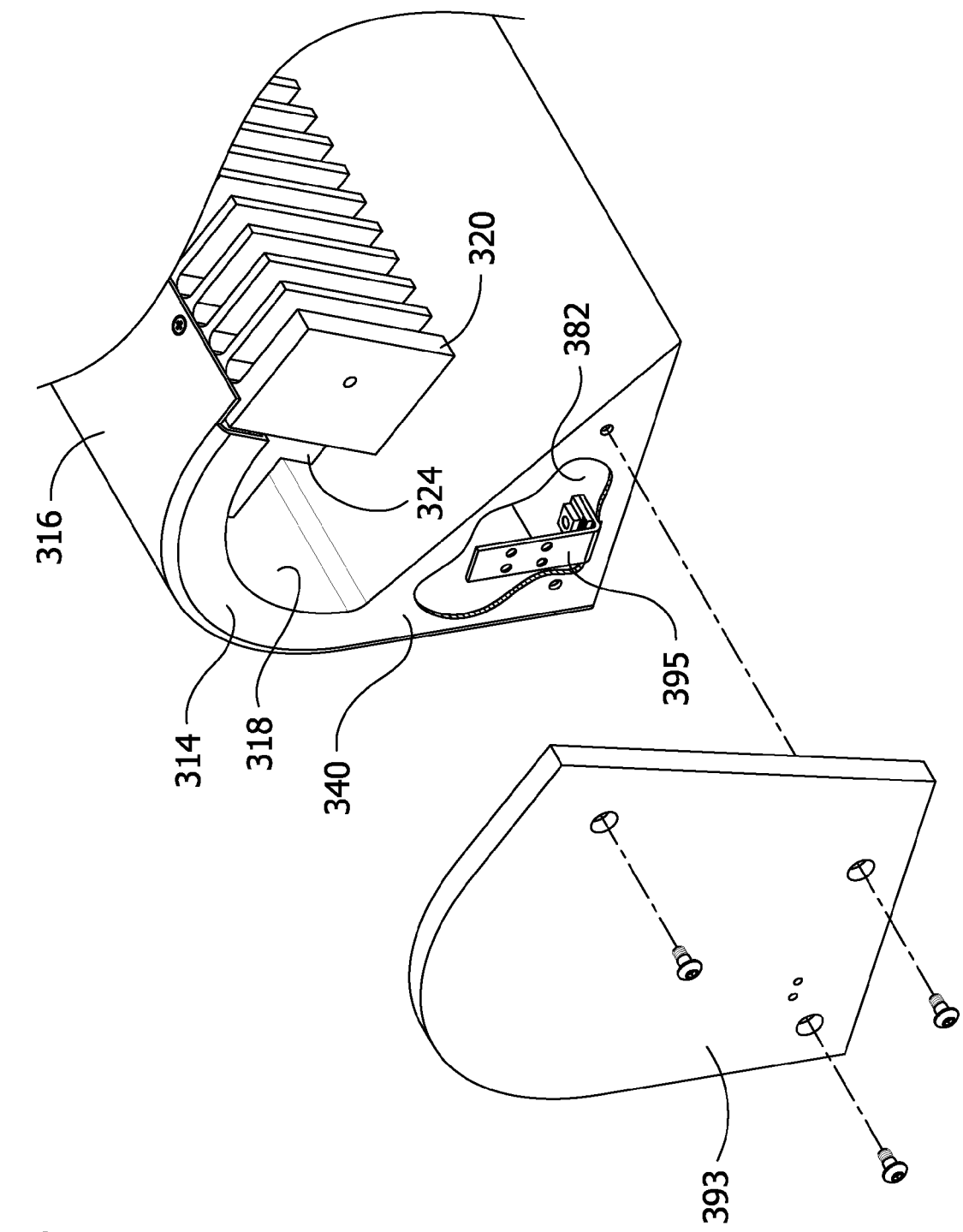
FIG. 2 is an exploded view with parts broken away of one end of light fixture of the luminaire of FIG. 1.
Figure 3A:
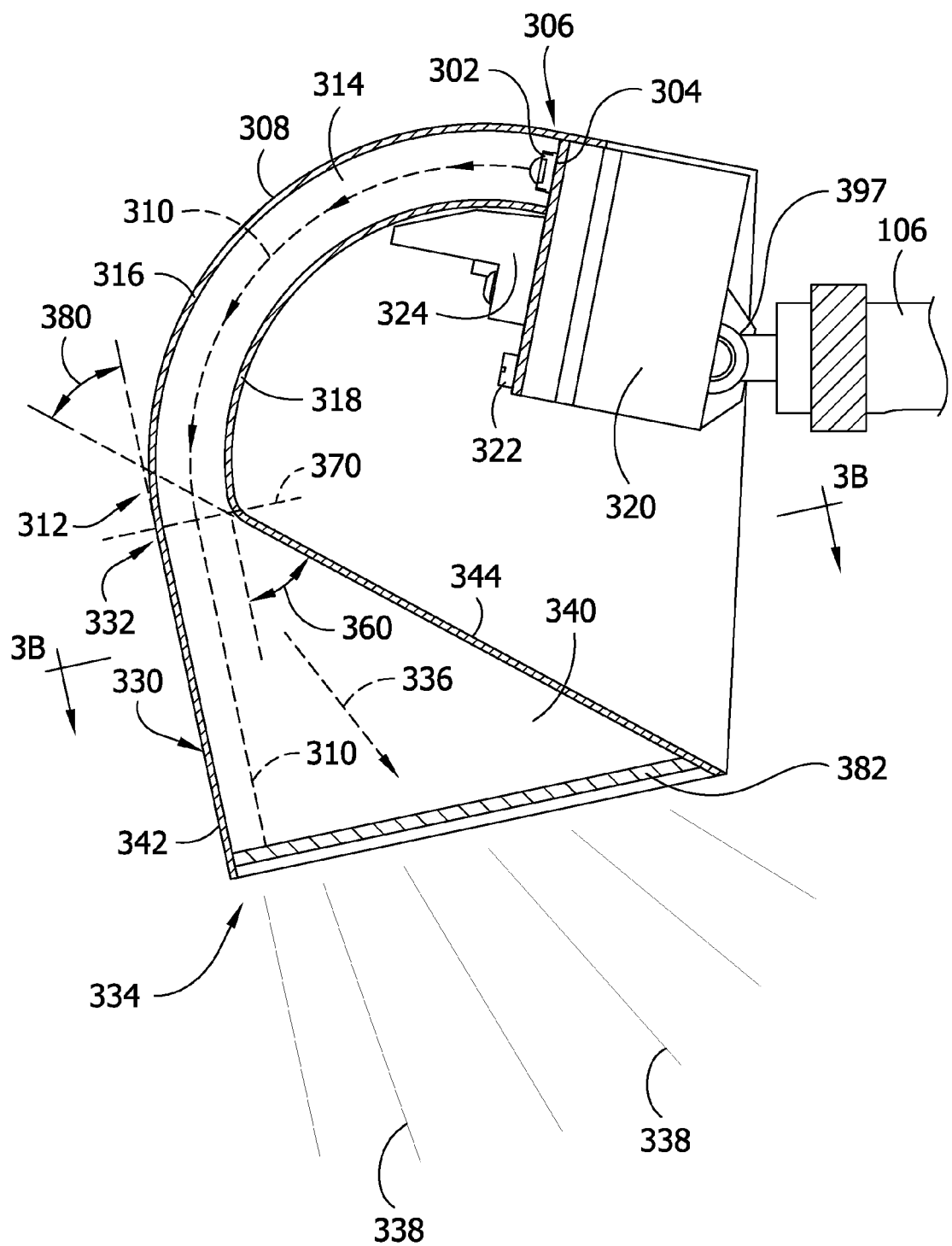
FIG. 3A is a partial vertical cross sectional view of the luminaire illustrated in FIG. 1 taken along lines 3-3.

FIG. 2 illustrates an exploded view with parts broken away of one end of the light fixture 102 of the luminaire 100 of FIG. 1. FIG. 3A illustrates a vertical cross sectional view of the luminaire 100 taken along lines 3-3 of FIG. 1. Referring to FIGS. 2 and 3, a linear, planar array of LEDs 302 is mounted on a printed circuit board 304 (see FIG. 15) located at an input port 306 of a radiation guide 308 such as a visible light guide. The light emitted by the LEDs 302 is transmitted into the guide 308. The light from the LEDs 302 is directed along a guide light path (indicated by the arrows) by the guide along a curved (e.g., not flat and/or not linear) optical guide plane 310 extending from the input port 306 to an output port 312 of the guide 308. The curved plane 310 facilitates mixing of the light from wide viewing angle LEDs, for example a Lambertian LED with 120 degree viewing angle. The guide 308 has parallel sides 314 and has a curved or non-planar top 316 and a curved or non-planar bottom 318 parallel to each other so that the guide has a rectangular cross section perpendicular to the optical guide plane 310. In general, the cross section of radiation guide 308 may have any shape which is optimized depending on the type and shape of the array of LEDs 302 and/or depending on output needs.

In one embodiment, the board 304 is mounted in heat transfer relation to a heat sink 320 for dissipating any heat generated by the LEDs 302. Screws 322 may be employed to affix the board 304 to the heat sink 320. A support 324 may be positioned on the board 304 between the board and the guide 308. In one embodiment, an optimal and compact heat sink design may be used for good heat dissipation. Also, a diffused black painted exterior may be employed for a stylish look and to assist in heat dissipation.

An output section 330 has an input port 332 which operatively connects to, engages and is positioned adjacent to the output port 312 of the guide 308. The output section 330 has an output aperture 334 and defines an aperture light path 336 extending from the input port to the output port directing light 338 transmitted by the LEDs 302 via the guide 308. The output aperture 330 has parallel sides 340 and a top 342 and a bottom 344 which are not parallel to each other so that aperture 330 has a rectangular cross section perpendicular to the aperture light path 336 (see FIG. 3B). In addition, the output aperture 330 has a rectangular cross section 392 perpendicular to the optical guide plane 310 extending through the aperture 330 (see FIG. 3B).

Figure 3B:
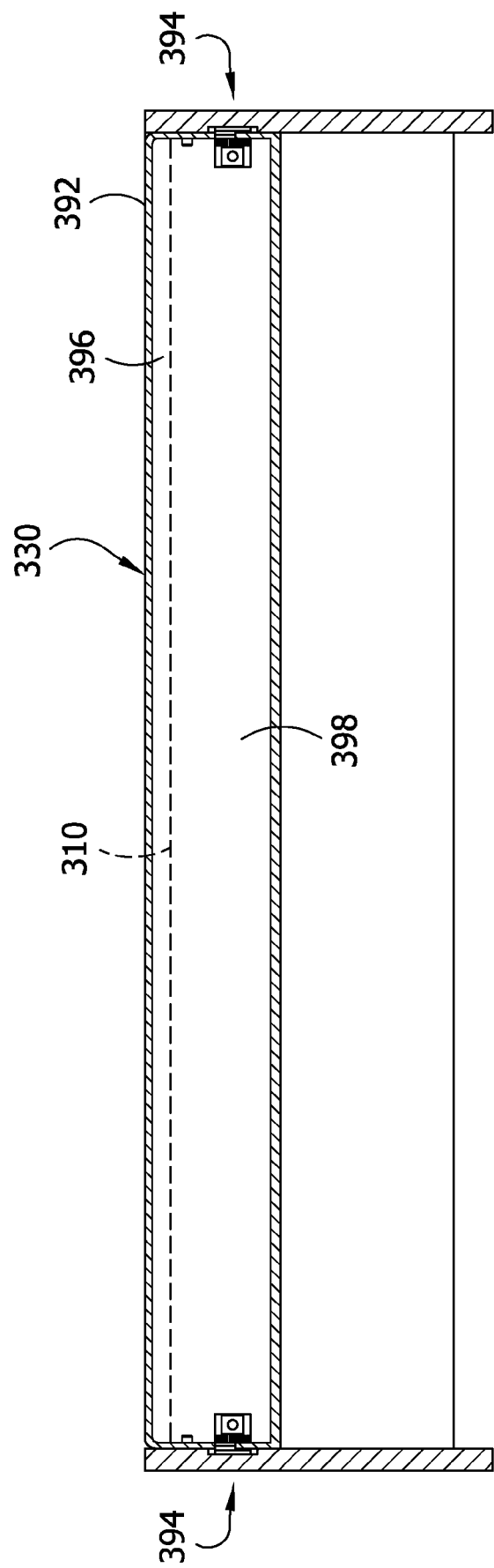
FIG. 3B is a cross sectional top plan view of the output aperture, according to one embodiment of the invention, taken along lines 3B-3B of FIG. 3A.

As a result, as shown in FIG. 3B, the cross section 392 of the output aperture 330 is asymmetrical relative to the optical guide plane 310 such that the plane 310 is not located at the center 394 of the aperture 330. In other words, a cross sectional area 396 of the output port 332 of the aperture 330 which is above the optical guide plane 310 is less than a cross sectional area 398 of the output port 332 of the aperture 330 which is below the optical guide plane 310. In other words, the output port 334 of the output aperture 330 is offset from the input port 332 of the aperture 330 relative to the optical guide plane 310. As shown in the embodiment illustrated in FIG. 3A, the rectangular cross section of the input port 332 of the aperture 330 (taken orthogonal to the plane 310) is symmetrical relative to the optical guide plane 310 whereas the rectangular cross section of the output port 332 of the aperture 330 (taken orthogonal to the plane 310) is not symmetrical relative to the optical guide plane 310. In general, the input port 332 of the aperture 330 is symmetrical relative to the optical guide plane 310 whereas rectangular cross section of the output port 332 of the aperture 330 is not symmetrical relative to the optical guide plane 310.

Figure 4A:
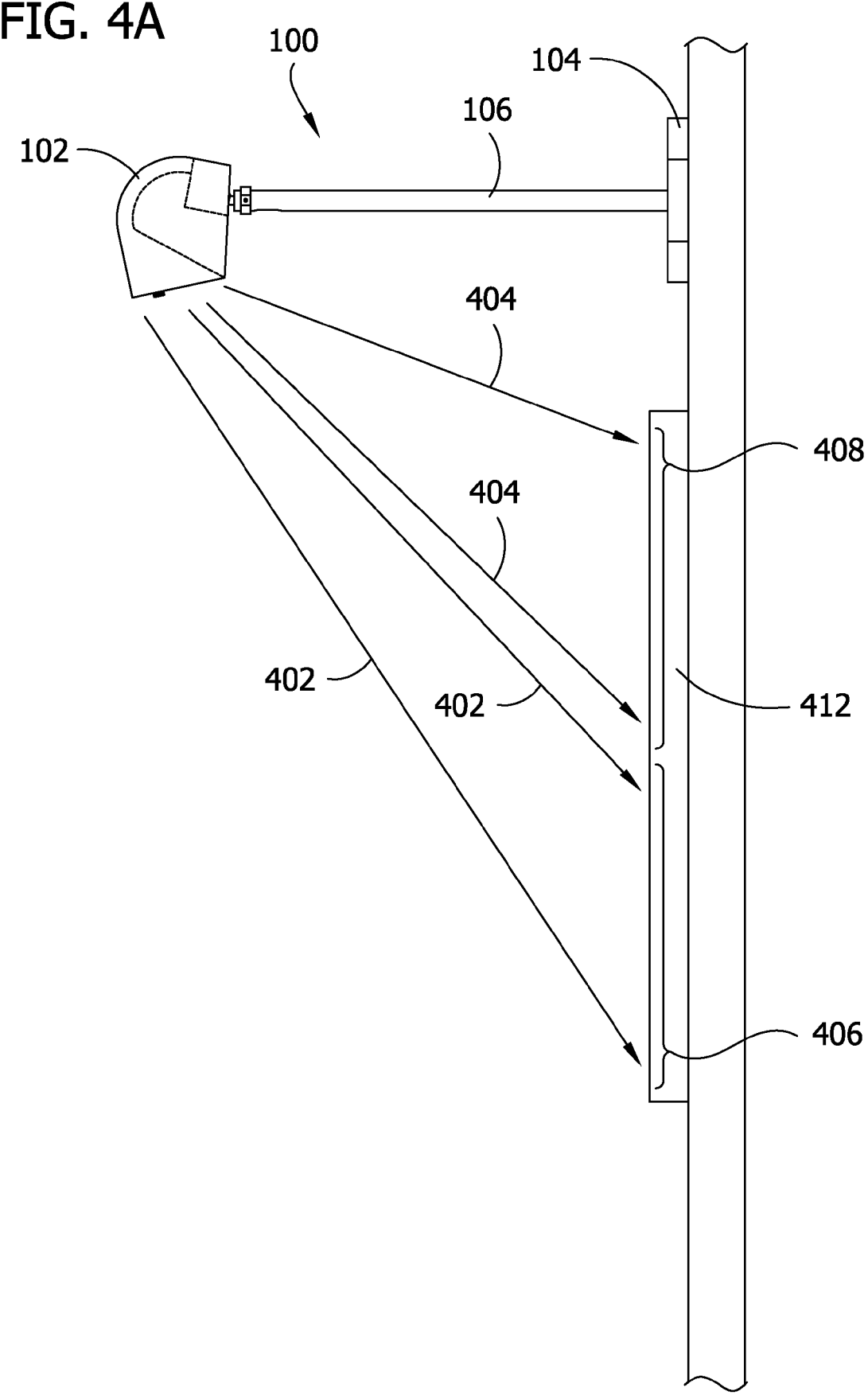
FIG. 4A is a side cross sectional view of the luminaire mounted on a wall over a painting, as shown in perspective in FIG. 4B.

As shown in FIG. 4A, one result of this asymmetrical configuration is that the painting 412 is more uniformly illuminated. The intensity of light transmitted through area 396 as generally indicated between arrows 402 is greater than the intensity of light transmitted through area 398 as generally indicated between arrows 404. Thus, an area 406 of painting 412 is being illuminated by higher intensity light 404 which is farther from the light fixture 102 than an area 408 which being illuminated by the lower intensity light 404 which is closer to the light fixture 102. As a result, the beam of light output by the luminaire 102 has a non-uniform, asymmetric intensity so that the painting 412 is more uniformly illuminated. As illustrated in FIG. 3A, the position and viewing angle of the LEDs, the shape and material of the radiation guide, the output aperture shape, and the output diffuser 382 or a lens, among other things, determines the spread of light being applied to the painting 412. The asymmetry allows light of higher intensity to be distributed to the areas being illuminated which are farther away from the fixture 102 so that light distributed to the bottom of the painting or wall provides more even illumination. The asymmetry also allows light of lower intensity to be distributed to the areas being illuminated which are closer to the fixture 102 so that light distributed to the top of the painting or wall provides more even illumination.

Angles 360 and 380 are a function of (1) the offset between the input port and output port of the aperture, (2) the size and viewing angle of the LEDs, (3) the shape and material of the radiation guide 308, (4) the shape of the radiation guide aperture 330, (5) any diffuser 382 or control lens (not shown) in the light path or at the output aperture, (6) the distance to the painting and size of the painting, and (7) the angular relation between top 342 and bottom 344. In one embodiment, the offset defines the angle 360 as an acute angle in the range of about 0°-90°.

In one embodiment, it is contemplated that a plane 370 would be coincident with the output port 312 of the guide 308 and the input port 332 of the aperture 330. In this configuration, the optical guide plane 310 extended within the aperture 330 would be orthogonal with the plane 370. Also, the optical guide plane 310 would be parallel with the top 342 of the aperture 330 and the bottom 344 of the aperture 330 would be at angle 360 with a plane 372 orthogonal with the plane 370. This configuration facilitates the asymmetrical positioning of the output port 334 of the aperture 330 relative to the guide 308 to spread the light for more uniformity. In certain applications, it is contemplated that the top 342 of the aperture 330 may be angled toward or away from the plane 310.

In one embodiment, top 342 and bottom 344 of aperture 330 form an acute angle 380 in the range of about 0°-90°. It is also contemplated that the angle 380 may be equal to or greater than 90° in some embodiments.

As illustrated in FIG. 3A, it is also contemplated that a diffuser 382 may optionally be positioned at the output port 334 of the aperture 330 such that at least some of the light output from the output port 334 of the aperture 330 is transmitted via the diffuser 382. Optionally or in addition, a diffuser (not shown) and/or a control lens (not shown) may be positioned along the light path, such as within the output aperture 330. Optionally or in addition, a diffuser (not shown) and/or a control lens (not shown) may be positioned within the radiation guide 308. For example, a diffuser (not shown) and/or a control lens (not shown) may be positioned over the LEDs 302, at the input port 306 of guide 308, at the output port 312 of the guide 308, at the input port 332 of aperture 330, and/or at the output port 334 of aperture 330. For example, the control lens may be an array of prismatic lens running top to bottom to further shape the asymmetric beam spread in the horizontal direction (left to right on the painting).

Alternatively and in addition, an in-line diffuser located within the guide and/or within the aperture or both may employed for minimizing color shadowing and better color uniformity. For example, a 5°-40° holographic diffuser distributed by Luminit may be employed to help minimize shadowing. These controlled diffusers are also generally more optically efficient than frosted-lens based diffusers. The optical diffuser(s) may be placed anywhere in the radiation guide and/or aperture and each diffuser may be at an angle chosen so as to minimize shadowing.

A diffuser panel with low transmission losses is optional to homogenize the multiple images of the light within the guide and can be placed at various locations within the radiation guide. In some embodiments, allowing a space of at least 1" between the diffuser panel and the LEDs improves the diffusion and angle control performance of the panel; a second diffuser cover may also be employed. A lens may also be used at the output or within the radiation guide. Thus, beam control can be achieved by at least one or more of the following: controlling the color mixing within the radiation guide, by selecting one or more diffusers, by the coating of the guide and aperture, by various lens combinations, by the guide and aperture shapes and by a shroud.

Referring to FIGS. 2 and 3, those skilled in the art will recognize that other optional features may be included in the luminaire 100. For example, an end cap 393 may be attached to each end of the light fixture 102, such as to the sides 340 of aperture 330 and/or to the heat sink 320. A bracket 395 may link each side 340 to the diffuser 382. Also, a pivoting or hinged connector 397 may link the light fixture 102 to the supports 106 to facilitate positioning of the light output relative to the painting or wall being illuminated. For example, tilt, skew, and distance may be adjusted relative to a painting being illuminated.

Figure 4B:
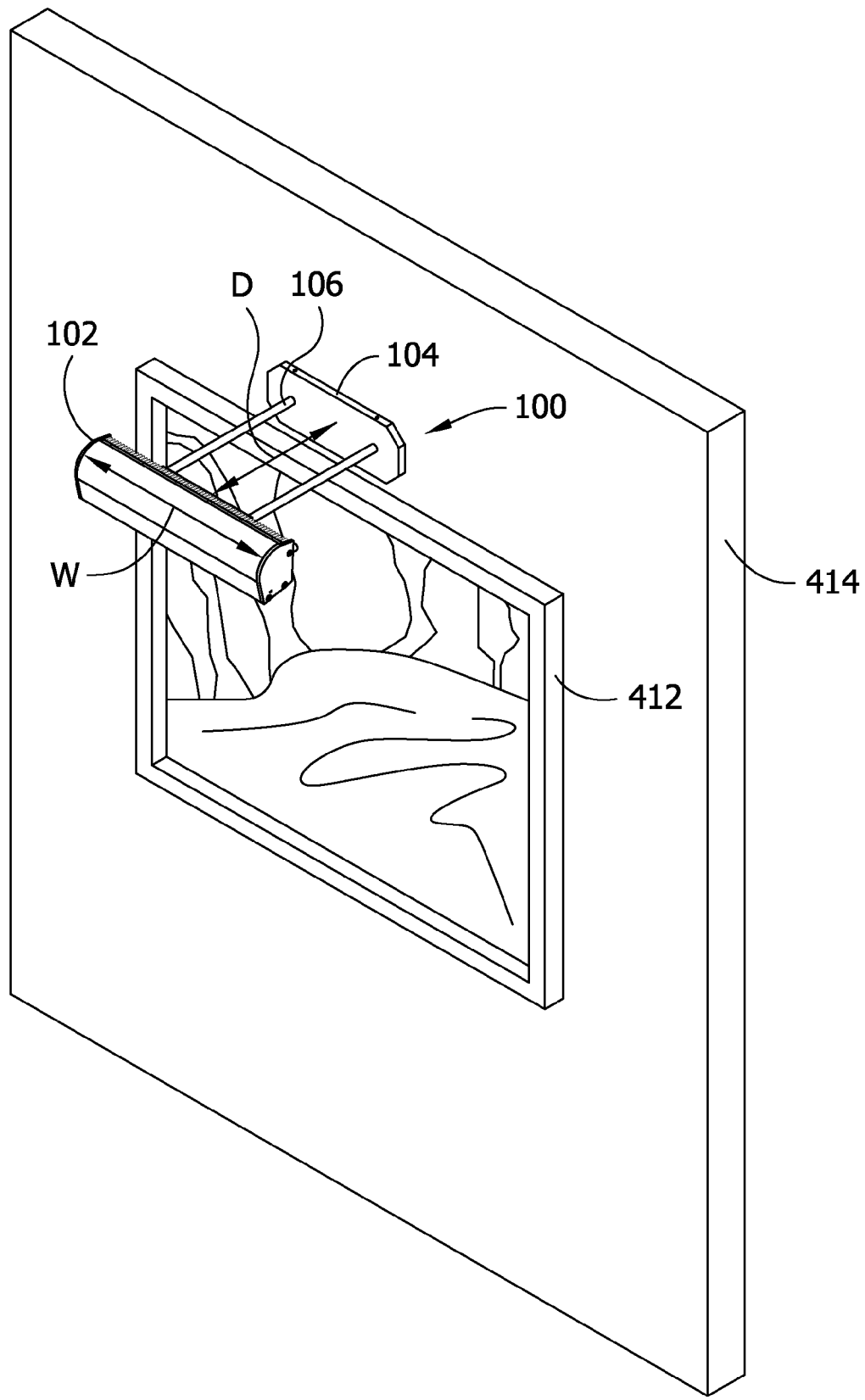
FIG. 4B illustrates the luminaire of FIG. 1 mounted on a wall over a painting.

FIG. 4B illustrates the luminaire 100 of FIG. 1 mounted to illuminate a painting 412 on a wall 414. In this embodiment, the luminaire 100 is mounted to the wall 414 and its light fixture 102 would include 42 Lambertian LEDs having a 90° beam spread function as an optical source. Lambertian LEDs emit according to Lambert's cosine law, i.e., a peripheral intensity is directly proportional to the cosine of the angle from which it is viewed. In other words, Lambertian LEDs produce a bright hot spot or a beam with some peripheral light but without the artifacts associated with a side-emitter. In one embodiment, if less LEDs are employed (e.g., less than 42), the LEDs can be placed alternatively or any other combination that can fit the number of LEDs in the same length of the printed circuit board or the luminaire 100 can be made smaller by employing higher viewing angle LEDs and brighter LEDs. Such a fixture may have width W of about 21" (about 53 cm) and would be mounted at a distance D of about 18" (about 46 cm) from the wall and at about 12 degrees tilt from horizontal in order to illuminate a painting 412 about 4'×4' (about 122 cm×122 cm). Those skilled in the art will recognize that these dimensions are exemplary and other dimensions may be employed. For example, if less LEDs are employed, they can be placed on the same PCB with alternating placements or with a smaller size luminaire and wider beam/viewing angles for the LEDs.

Examples of the Lambertian LED are a TerraLUX TLE-5 and TLE-DB3 (DB-3W), red, green and white or CREE LEDs such as the white XR-E and the colored X-lamps. It is contemplated that the LEDs may be selected to achieve a CRI (Color Rendering Index) in the range of 85-95 for various modes of operation. This CRI is considered good for painting illumination and maybe changed higher or lower by selecting the appropriate LEDs. In addition, the SPD (spectral power distribution) for the LEDs should be selected to achieve the color temperature and the CRI desired for each mode. This can be achieved through different color combinations of LEDs as needed.

In one embodiment, the intent is to maximize the footcandles at the center of the painting with good uniformity in lumens per square millimeter. For example, a museum luminaire according to embodiments of the invention for illuminating paintings would be configured to have 4:1 illumination uniformity and/or a color uniformity top to bottom +/−50K. The radiation guide shape and the aperture shape, and the distance to the painting may be designed and adjusted for better illuminance uniformity, depending on the application and use of the luminaire. Alternatively, a shroud (not shown in FIG. 3A) located at the output port 334 of the aperture 330 may be employed to assist in controlling uniformity.

Alternatively and in addition, the curvature and/or the inside surface of the guide and/or of the aperture may have or may be coated with gloss white paint for minimizing or eliminating contrast of the color shadowing created by the multiple LEDs and for better color uniformity. For example, an interior surface of the guide 308 may be adapted to scatter and/or diffuse light emitted by the array of LEDs 302 that impinges on the interior surface. Some different materials that may be used for the radiation guide and/or aperture are a Furukawa diffused reflector (MCPET), barium sulfate paint (e.g., a highly diffusing, reflective white paint with a barium sulfate base), glossy paint, white powder coat paint, a mirrored surface, a glass/plastic light material and powder coat white paint 80-85% reflectivity.

It is also contemplated that the radiation guide may be bare aluminum or may have a reflective or diffusive coating or may have a TIR (total internal reflection) interior or may be glass or acrylic, or a combination thereof. In one embodiment, the length of the radiation guide along the light path may be optimized and be sufficient to substantially color mix the output light and a diffuser is selected based on the length to homogenize any multiple reflections caused by reflected light within the guide and to enhance the homogenization.

As described below with regard to FIG. 14, the LEDs 302 may be selectively energized to create different lighting effects, such as wavelengths spectrums having the following temperatures: 1994 K (e.g., candlelight), 3300 K (e.g., dawn/dusk mode), 4700 K (e.g., moonlight), 5500K (e.g., sunny day), and 6500 K (e.g., blue sky with sun). The names associated with these CCTs are mentioned for reference and can be tuned by the luminaire to achieve the desired color temperature and scenario as required by specifications.

Figure 5:
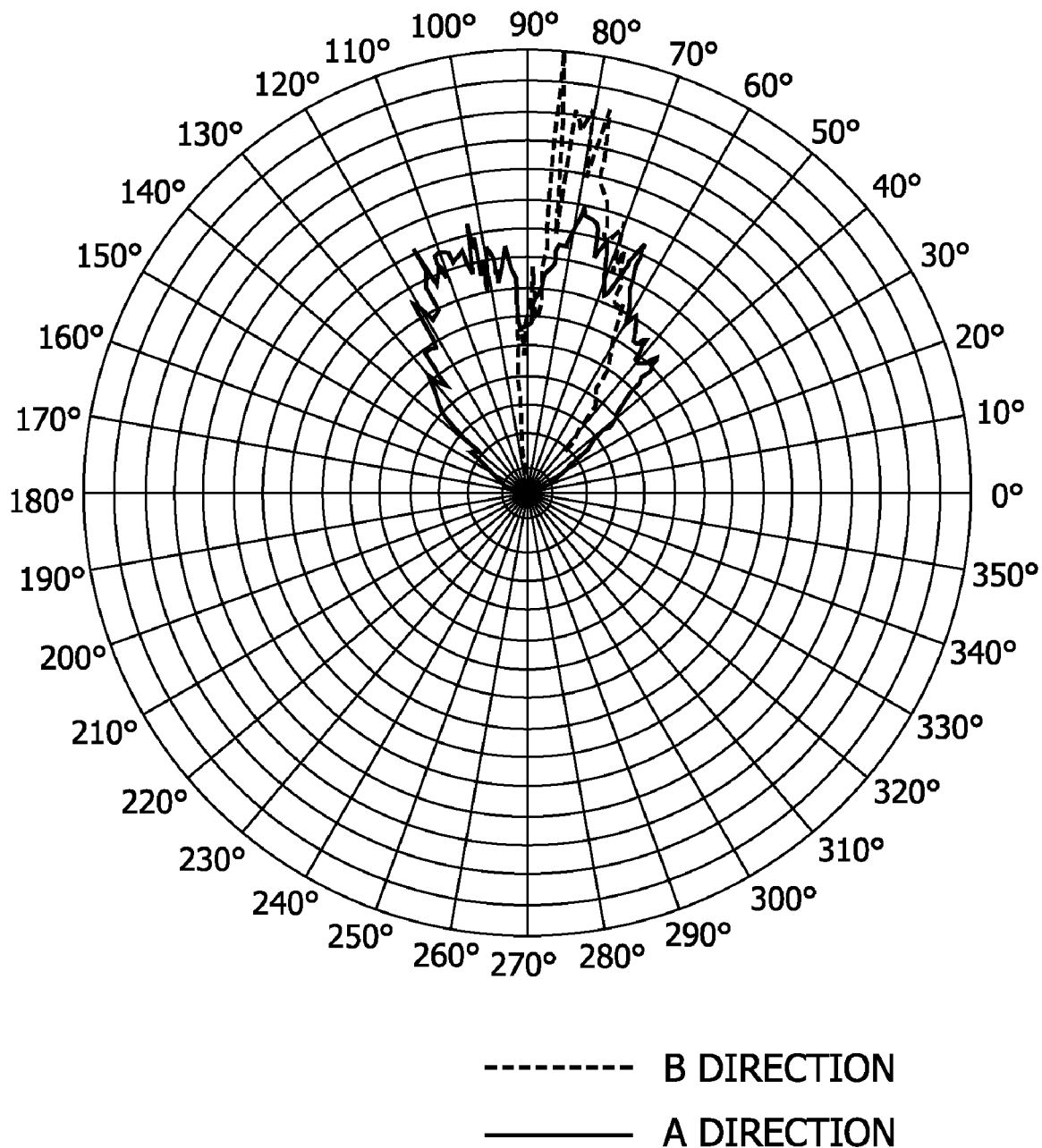
FIG. 5 illustrates a computer simulation for vertical (A) and horizontal (B) beam angles in lumens per square millimeter, without a diffuser at its output aperture.

FIG. 5 illustrates a computer simulation for horizontal (A) and vertical (B) beam angles in lumens per square millimeter, without a diffuser at its output aperture.

In FIGS. 6-11, the specific LED colors used for illumination to get the CRI values are the CREE™ red, green, blue, amber, coolwhite and warmwhite LEDs. These LEDs are mixed with a certain ratio to achieve a CCT (correlated color temperature) range of 1900 K-6500 K. The following are the Color Rendering Index (CRI) values and spectra at some CCT settings.

Figure 6:
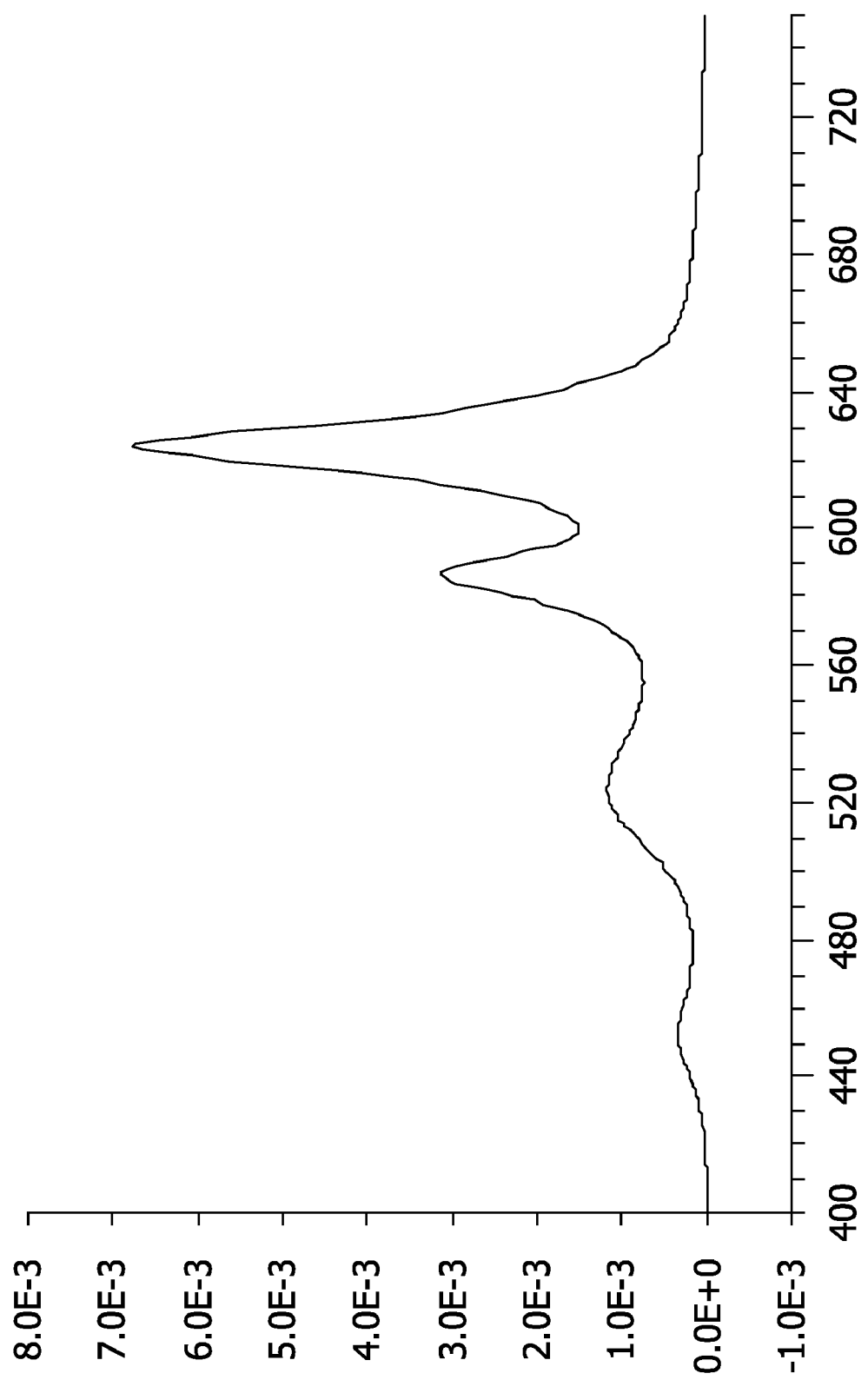
In FIGS. 6-11, an embodiment is illustrated in which the specific LED colors used for illumination to accomplish the CRI values are the CREE™ red, green, blue, amber, cool-white and warmwhite LEDs. These LEDs are mixed to achieve a CCT (correlated color temperature) range of 1900 K-6500 K. The tables indicate the Color Rendering Index (CRI) values and spectra at the CCT settings.
Figure 7:
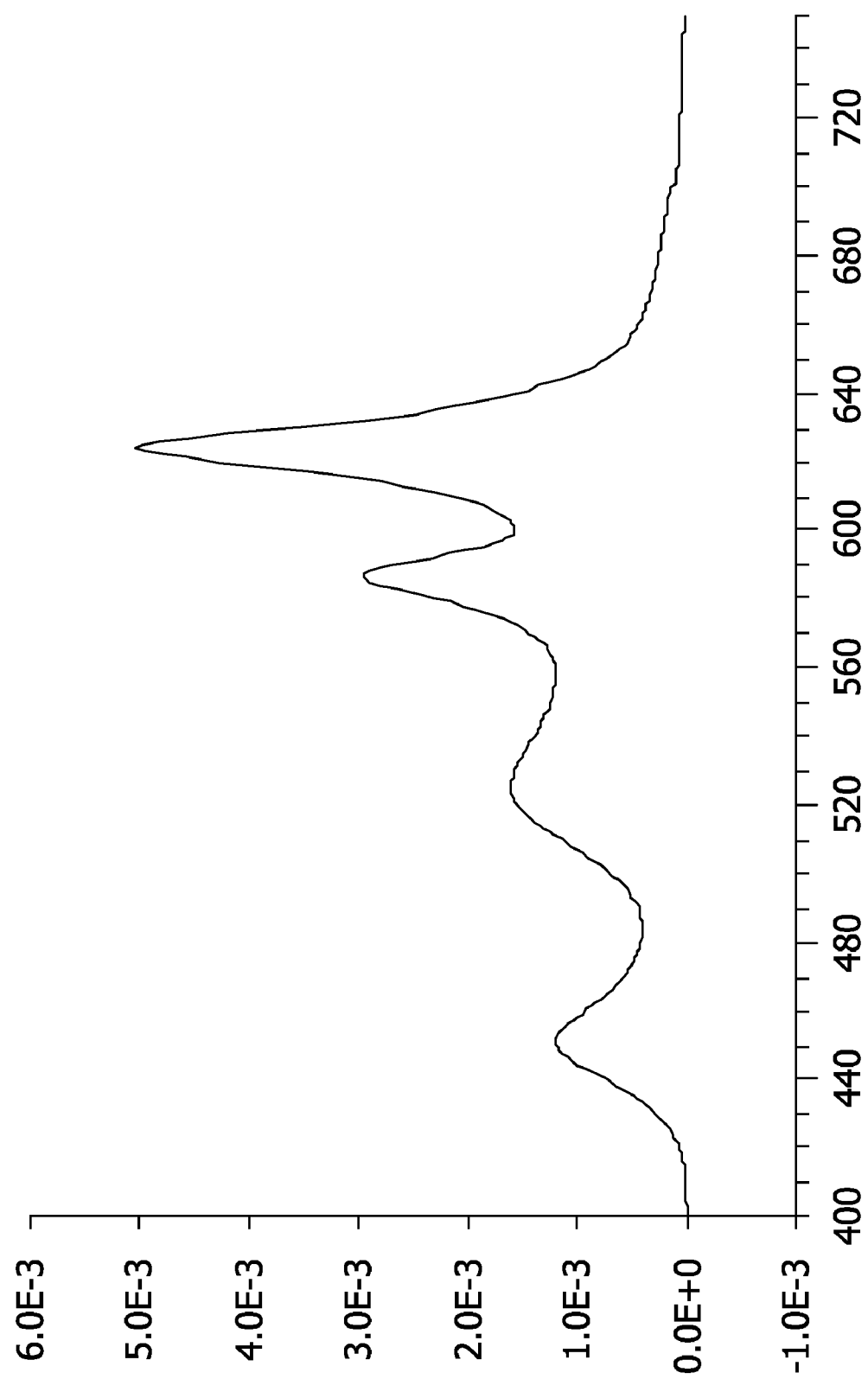

FIGS. 6 and 7 illustrate optical spectral data in wavelength vs. watts/nm in dim and bright candlelight modes (~1950 K and ~2800) with a CRI=87.7, of one embodiment of the invention operating in candlelight modes without a diffuser at its output aperture and compared to actual candlelight.

Table 7 illustrates the uniformity of illuminating at 1994 K based on a 3.5'×3.5' (107 cm×107 cm) painting at a distance of 18" (46 cm) from the top surface (see FIG. 4B) of the painting to the center of the luminaire having a light diffuser 382 at its output aperture. For example, such a luminaire may have a light fixture approximately 3.5" (about 9 cm) in depth and 21" (about 53 cm) in width. This is significantly smaller that many prior art fixtures for illuminating a 48"×48" painting which would be about 32" in width.

TABLE 7

Illuminance and CCT values for 1994 K on 3.5' × 3.5' painting

| Illuminance values in lux and CCT in Kelvin | | |
|---|---|---|
| 4.5 | 11.24 | 3.7 |
| 2066 | 2186 | 2232 |
| 14.2 | 18.6 | 11.34 |
| 1996 | 2134 | 2072 |
| 7.1 | 7.9 | 5 |
| 1994 | 1988 | 2028 |
| Illuminance uniformity | | |
| Ave/Min | 2.5 | |
| Max/Min | 5.0 | |
| Color uniformity top to bottom | | |
| Ave – Min | 114.7 | K |

Figure 8:
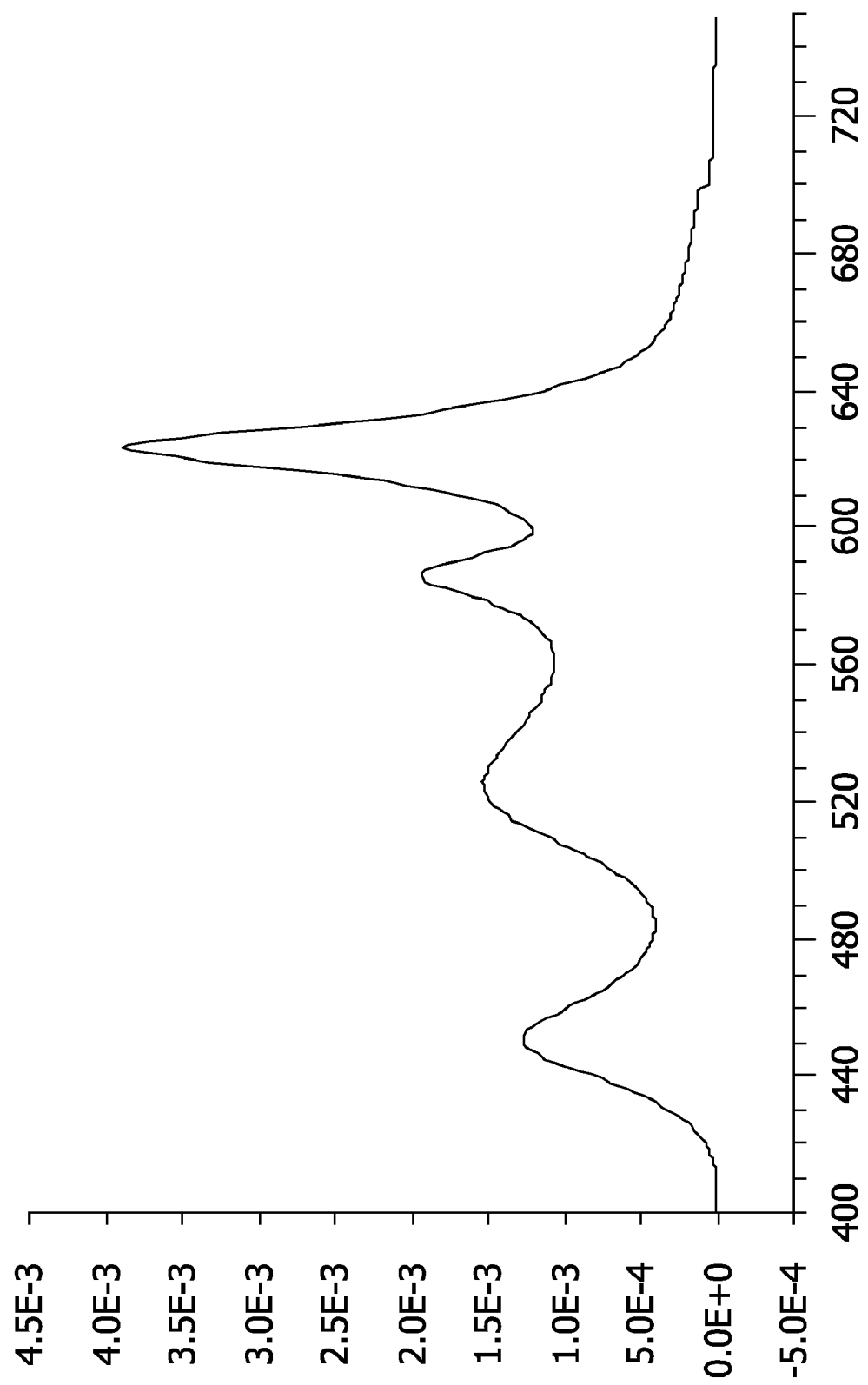

FIG. 8 illustrates optical spectral data in wavelength vs. watts/nm in a dawn/dusk mode (~3300K) with a CRI=93.7, of one embodiment of the invention operating in a dawn/dusk mode without a diffuser at its output aperture and compared to actual dawn/dusk lighting.

Table 8 illustrates the uniformity of illuminating at 3300 K a 3.5'×3.5' painting at a distance of 18" from the top surface (see FIG. 4B) of the painting to the center of the luminaire having a light diffuser at its output aperture.

TABLE 8

Illuminance and CCT values for 3300 K on 3.5' × 3.5' painting

| Illuminance values in lux and CCT in Kelvin | | |
|---|---|---|
| 4.7 | 13 | 4.2 |
| 3645 | 3773 | 3830 |
| 14.7 | 22.4 | 12.5 |
| 3466 | 3440 | 3345 |

TABLE 8-continued

Illuminance and CCT values for 3300 K on 3.5' × 3.5' painting

| 6.1 | 8.4 | 7.2 |
|---|---|---|
| 3393 | 3326 | 3384 |
| Illuminance uniformity | | |
| Ave/Min | 2.5 | |
| Max/Min | 5.3 | |
| Color uniformity top to bottom | | |
| Ave – Min | 187.0 | K |

Figure 9:
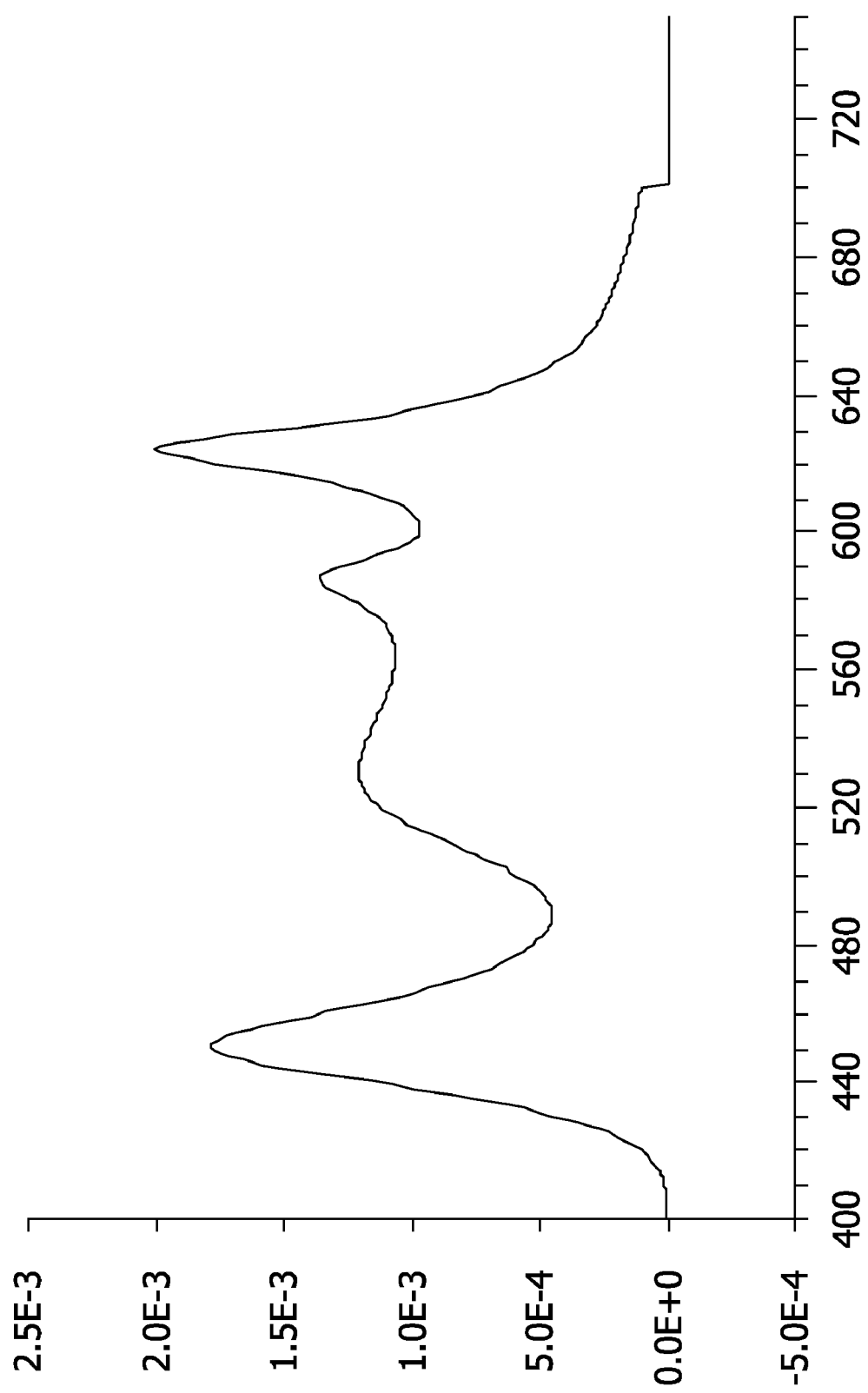

FIG. 9 illustrates optical spectral data in wavelength vs. watts/nm in a moonlight mode (~4700K) with a CRI=95.3, of one embodiment of the invention operating in a moonlight mode without a diffuser at its output aperture and compared to actual moonlight.

Table 9 illustrates the uniformity of illuminating at 4700 K a 3.5'×3.5' painting at a distance of 18" from the top surface (see FIG. 4B) of the painting to the center of the luminaire having a light diffuser at its output aperture.

TABLE 9

Illuminance and CCT values for 4700 K on 3.5' × 3.5' painting

| Illuminance values in lux and CCT in Kelvin | | |
|---|---|---|
| 7.4 | 20.1 | 6.6 |
| 5187 | 5262 | 5400 |
| 22.11 | 35.3 | 18.6 |
| 4864 | 4830 | 4770 |
| 10.9 | 13.1 | 9.6 |
| 4897 | 4852 | 4700 |
| Illuminance uniformity | | |
| Ave/Min | 2.4 | |
| Max/Min | 5.3 | |
| Color uniformity top to bottom | | |
| Ave – Min | 256.7 | K |

Figure 10:
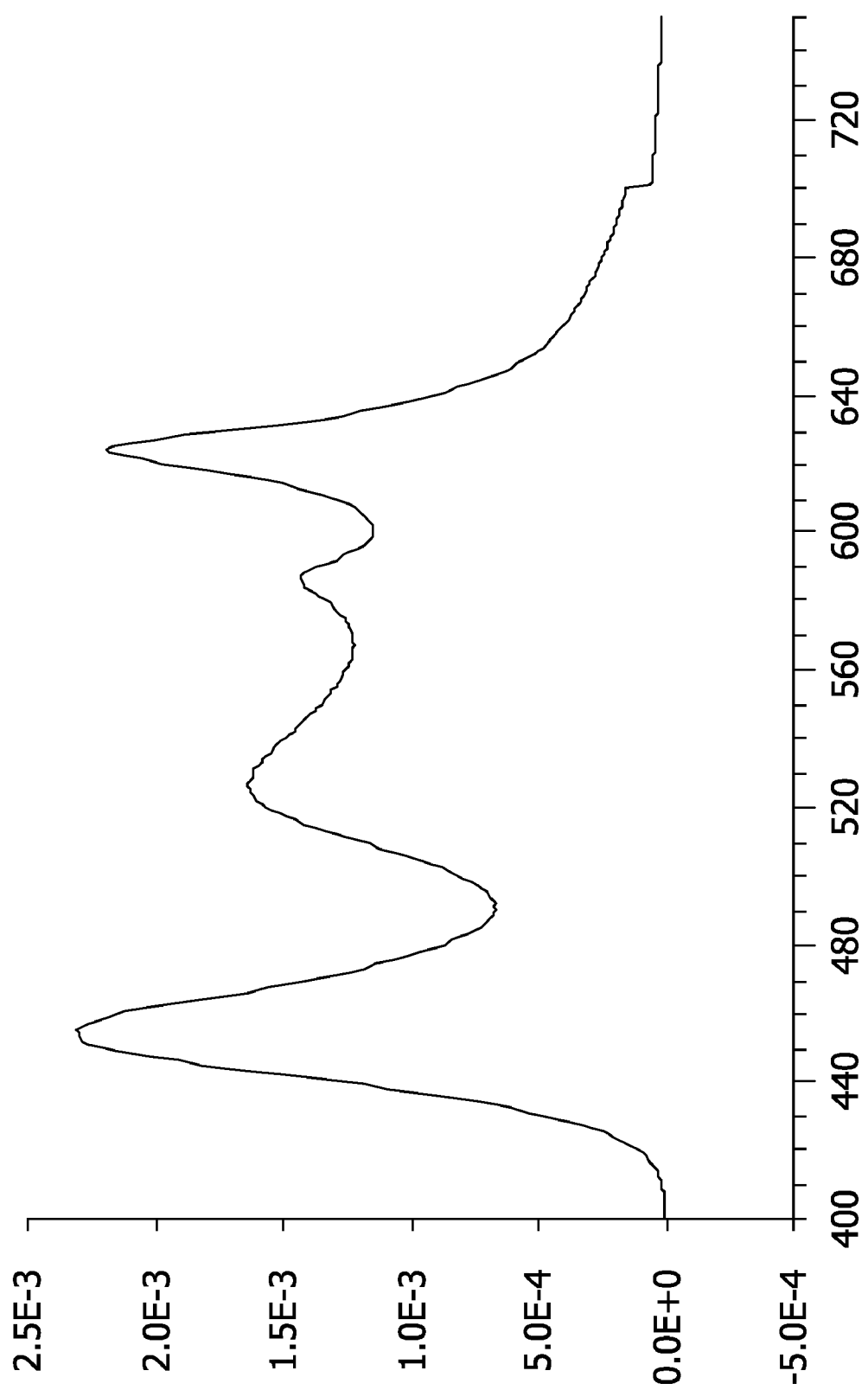

FIG. 10 illustrates optical spectral data in wavelength vs. watts/nm in a sunny day mode (~5500K) with a CRI=95.3, of one embodiment of the invention operating in a sunny day mode without a diffuser at its output aperture and compared to actual sunny day lighting.

Table 10 illustrates the uniformity of illuminating at 5500 K a 3.5'×3.5' painting at a distance of 18" from the top surface (see FIG. 4B) of the painting to the center of the luminaire having a light diffuser at its output aperture.

TABLE 10

Illuminance and CCT values for 5500 K on 3.5' × 3.5' painting

| Illuminance values in lux and CCT in Kelvin | | |
|---|---|---|
| 8.2 | 23 | 7.7 |
| 5758 | 5814 | 6154 |
| 26.5 | 38.4 | 24.4 |
| 5480 | 5480 | 5430 |
| 13.1 | 14.3 | 12.5 |
| 5540 | 5309 | 5422 |
| Illuminance uniformity | | |
| Ave/Min | 2.4 | |
| Max/Min | 5.0 | |

TABLE 10-continued

Illuminance and CCT values for 5500 K on 3.5' × 3.5' painting

| Color uniformity top to bottom | | |
|---|---|---|
| Ave − Min | 246.7 | K |

Figure 11:
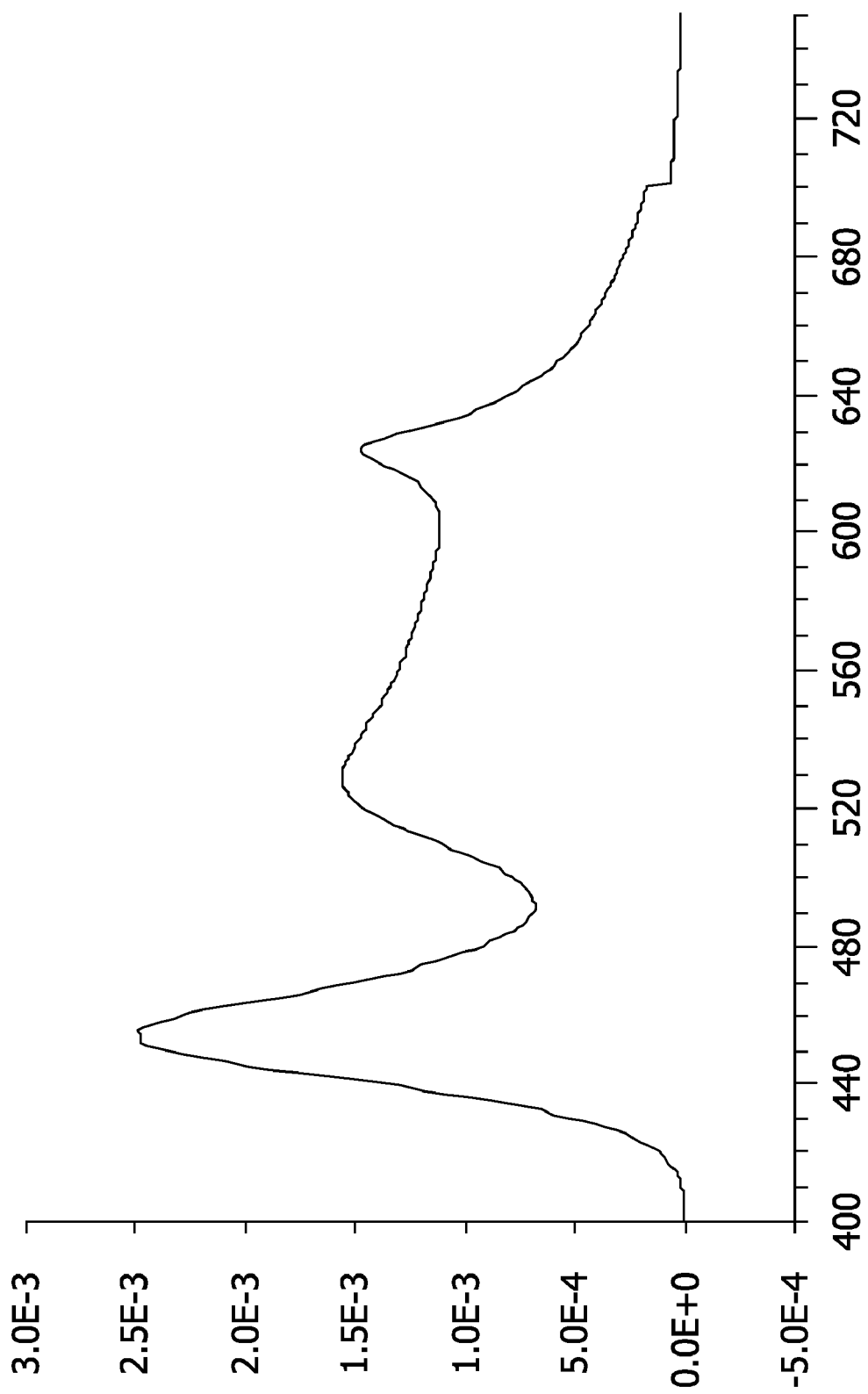

FIG. 11 illustrates optical spectral data in wavelength vs. watts/nm in a blue sky with sun mode (~6500K) with a CRI=91.4, of one embodiment of the invention operating in a blue sky with sun mode without a diffuser at its output aperture and compared to actual blue sky with sun lighting.

Table 11 illustrates the uniformity of illuminating at 6500 K a 3.5'×3.5' painting at a distance of 18" from the top surface (see FIG. 4B) of the painting to the center of the luminaire having a light diffuser at its output aperture.

TABLE 11

Illuminance and CCT values for 6500 K on 3.5" × 3.5" painting

| Illuminance values in lux and CCT in Kelvin | | |
|---|---|---|
| 8.1 | 21 | 6.6 |
| 6646 | 6654 | 6786 |
| 23.5 | 37.7 | 20.6 |
| 6324 | 6349 | 6239 |
| 11.33 | 14.5 | 9.5 |
| 6390 | 6397 | 6128 |
| Illuminance uniformity | | |
| Ave/Min | 2.6 | |
| Max/Min | 5.7 | |
| Color uniformity top to bottom | | |
| Ave − Min | 256.3 | K |

Table 12 illustrates the power consumption vs. color settings at stabilization with diffuser but minimal driver board cooling. In general, the LEDs do not have to be driven at maximum field intensity.

TABLE 12

| COLORS | WATTS |
|---|---|
| CANDLELIGHT | 51.341 |
| DAWN/DUSK | 45.784 |
| MOONLIGHT | 57.502 |
| SUNNY DAY | 64.836 |
| BLUE SKY/SUN | 52.425 |

Table 13 illustrates one example of the lumens on a painting according to the invention.

TABLE 13

| Lumens on painting: | | |
|---|---|---|
| Description | Lumens | |
| source | 1000 | |
| radiation guide | 412 | |
| on painting w/o diffuser | 220 | |
| on painting with diffuser | 187 | calculated |

Table 14 illustrates the illuminance on a painting indicating uniformity. (max/min ~5:1)

| Lux values on 4 ft painting | | |
|---|---|---|
| 60 | 126 | 60 |
| 59 | 84 | 50 |
| 43 | 58 | 24 |

Table 15 illustrates and color uniformity.

| COLOR SETTING | ILLUMINANCE UNIFORMITY | COLOR UNIFORMITY (K) |
|---|---|---|
| CANDLELIGHT 1950K | Ave/min = 2.5<br>Max/min = 5.0 | Ave − min = 115 |
| DAWN/DUSK 3300K | Ave/min = 2.5<br>Max/min = 5.3 | Ave − min = 187 |
| MOONLIGHT 4700K | Ave/min = 2.4<br>Max/min = 5.3 | Ave − min = 257 |
| SUNNYDAY 5500K | Ave/min = 2.4<br>Max/min = 5.0 | Ave − min = 247 |
| BLUE SKY/SUN 6500K | Ave/min = 2.6<br>Max/min = 5.7 | Ave − min = 256 |

Figure 12:
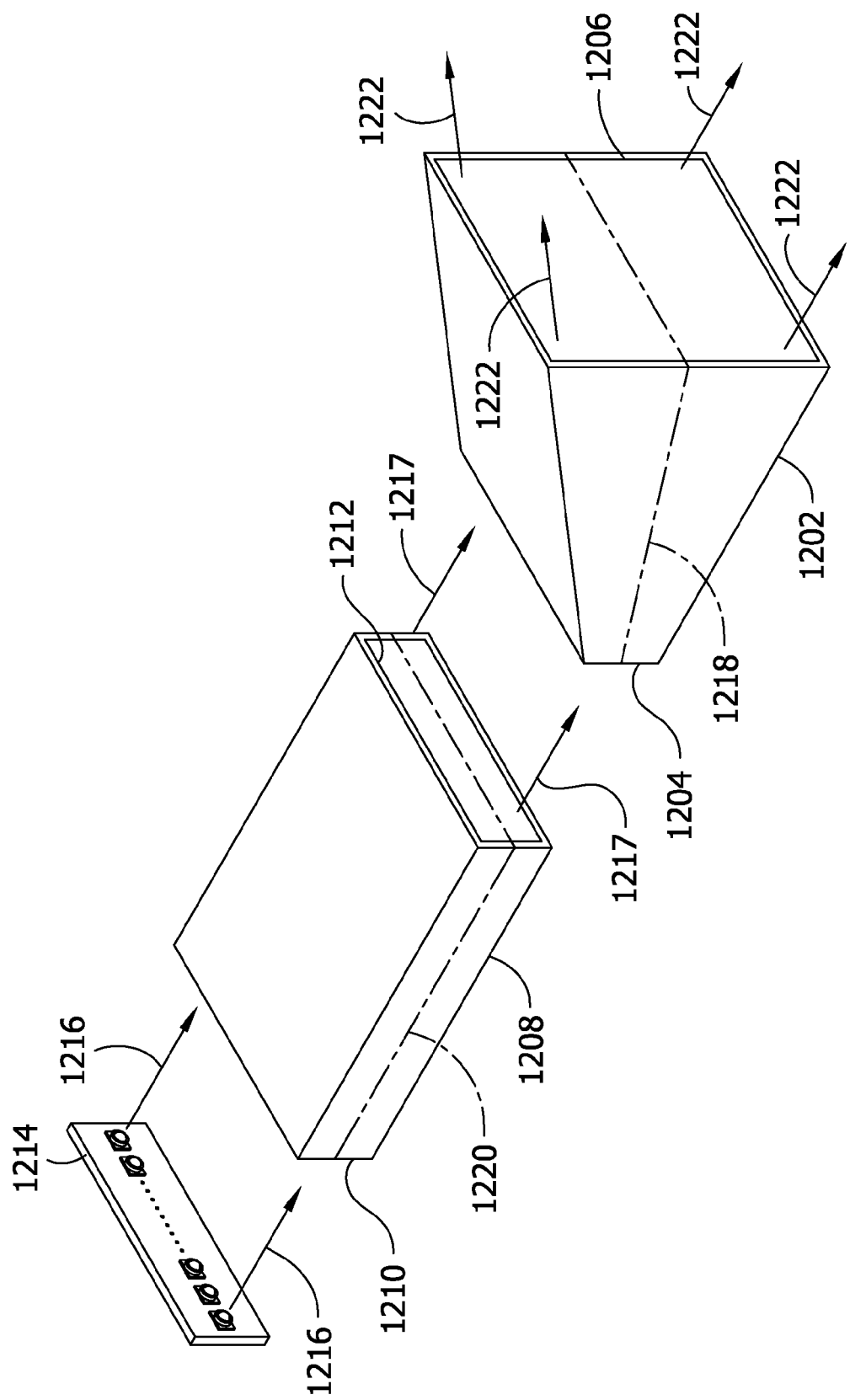
FIG. 12 is a perspective view of a linear configuration of one embodiment of a luminaire according to the invention.

FIG. 12 is a perspective view of a linear configuration of one embodiment of a luminaire according to the invention. For example, this configuration may be employed as a wall wash fixture which is recessed in the ceiling. The luminaire includes an output aperture 1202 having an input port 1204 and an output port 1206, and a radiation guide 1208 having an input port 1210 and an output port 1212. An array of LEDs 1214 are located at the input port 1210 of the guide 1208 such that light 1216 emitted by the LEDs 1214 is transmitted into the guide 1208 where it is mixed to form light 1217 directed into the input port 1204 of aperture 1202. The input port 1204 of the aperture 1202 is operatively connected and engages the output port 1212 of guide 1208 to direct light into the aperture 1202 and is positioned adjacent thereto such that a central plane 1218 of the output aperture 1202 is asymmetric relative to a central plane 1220 of the radiation guide 1208. In other words, the planes 1218 and 1220 are oblique relative to each other and are non-parallel and intersect. In one embodiment, the size and shape of the output port 1212 of the guide 1208 is substantially the same as the size and shape of the input port 1204 of the aperture 1202 but the output port 1206 of the aperture 1202 is a different size and/or shape, being generally larger to spread the light. The result is an asymmetric beam output 1222 from the output port 1206 of the aperture 1202. An asymmetrical beam output 1222 means that the intensity of light is measurably different at some points of the perpendicular cross section of the beam compared to other points of the perpendicular cross section.

Figure 13:
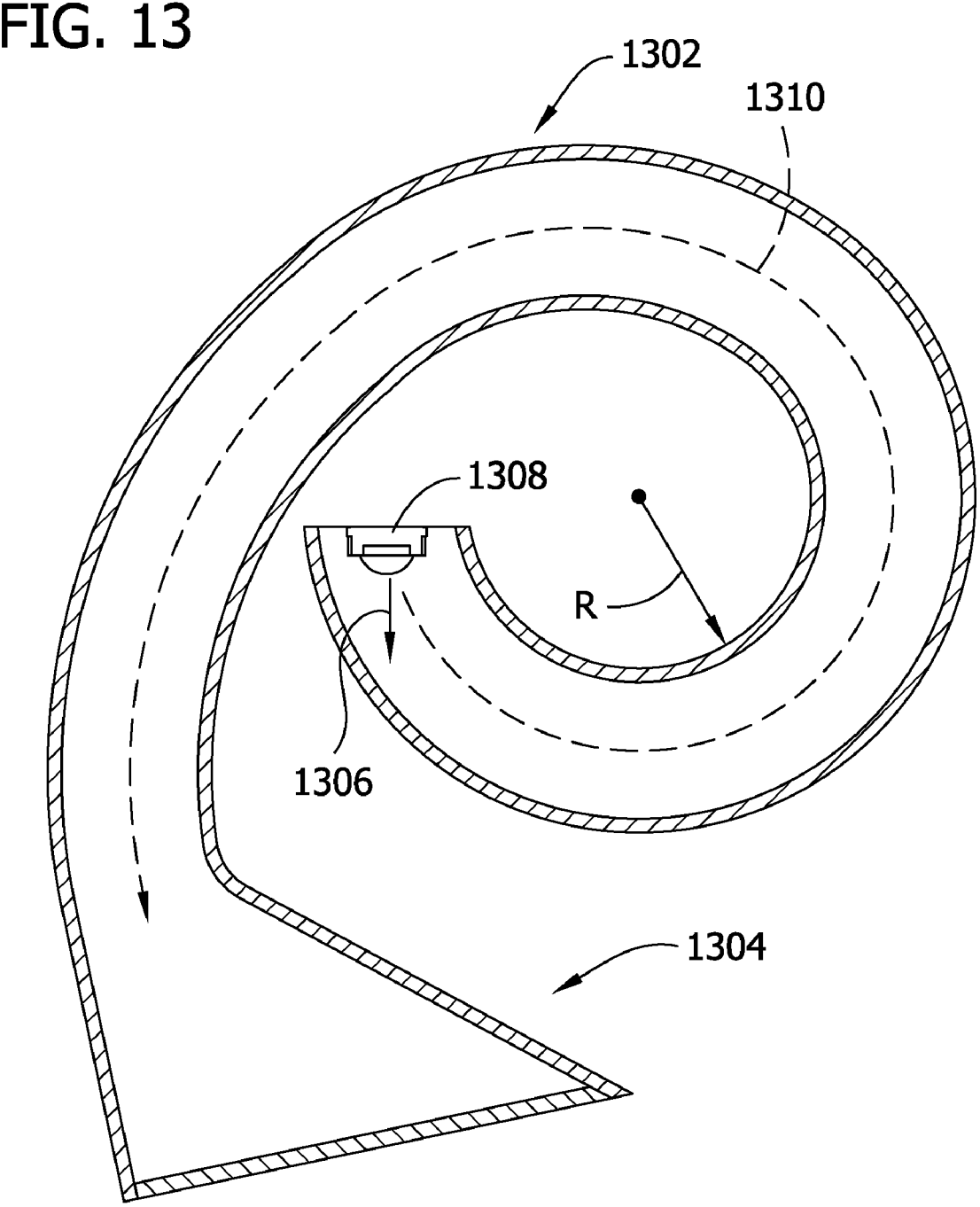
FIG. 13 is a cross sectional view of a spiral configuration of one embodiment of a luminaire according to the invention.

FIG. 13 is a cross sectional view of a spiral configuration of one embodiment of a luminaire. In one embodiment, which may be more compact and be generally smaller than the embodiment shown in FIG. 1, a minimum radius R of a curved spiral radiation guide 1302 terminating in an aperture 1304 can be used to facilitate the compact form. In another embodiment, a curvature of the guide 1302 has a maximum radius R such that beams of light 1306 from the light source 1308 are reflected at least once before being output (e.g., one bounce and scatter). In general, the length of the light path 1310 of the curved radiation guide 1302 such as illustrated in FIG. 13 may be about half the length or less of a linear radiation guide such as illustrated in FIG. 12, to facilitate the same amount of color mixing. The radius of the curvature and the shape may also be determined based on the uniformity needed in the farfield light distribution. In one form, FIG. 13 illustrates a "reverse folded" shape achieving compactness and color mixing along its length. Among other aspects, the minimum and maximum values for R depend upon the size of the LEDs and the materials used in the radiation guide.

Figure 14:
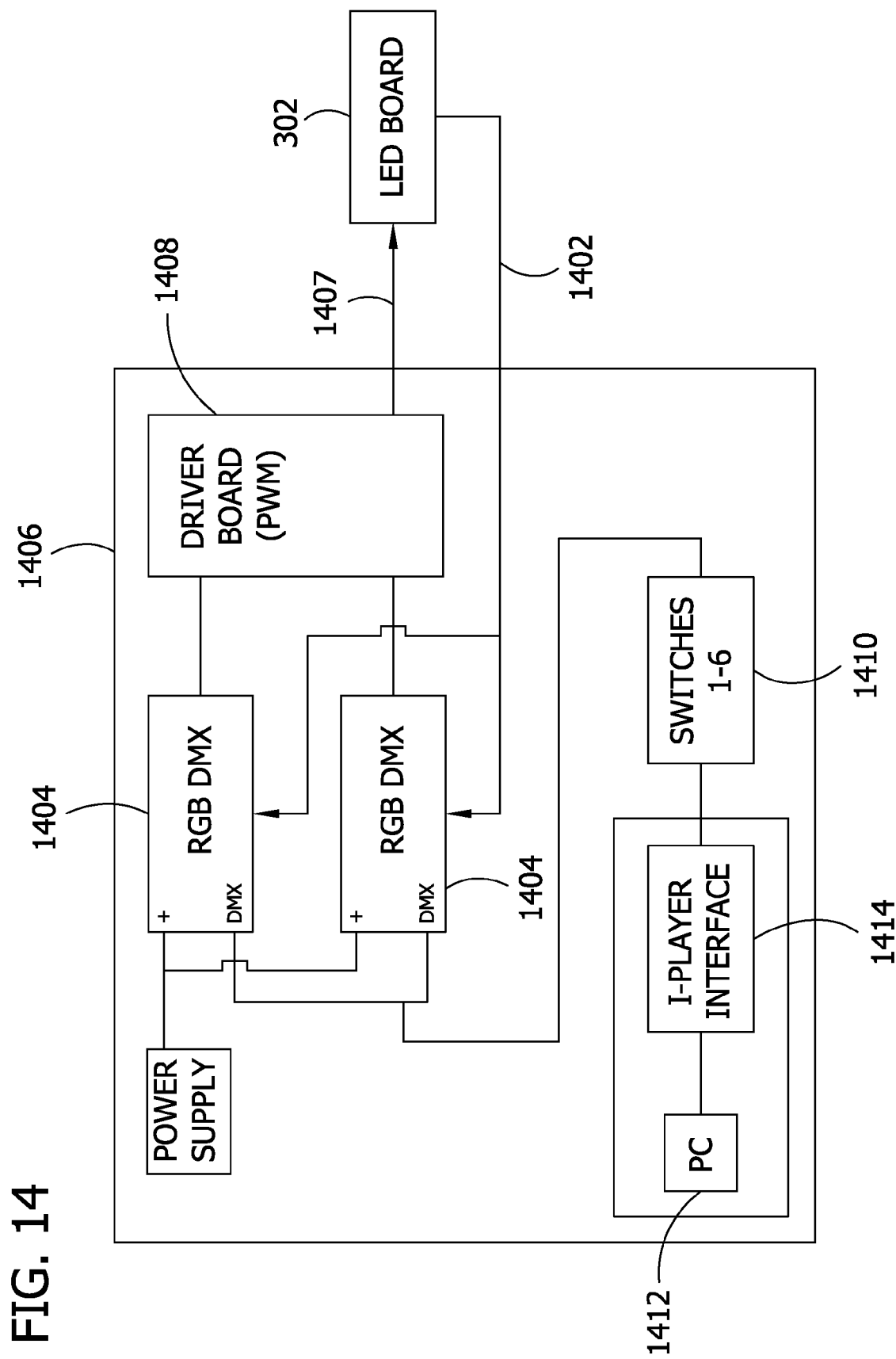
FIG. 14 block diagram of circuitry of one embodiment of the invention.

FIG. 14 is a block diagram of circuitry of one embodiment for color tuning from 1900 K-6500 K. As noted above and shown in FIG. 3A, the LEDs 302 may be any combination of red, green, blue, white and amber (as well as other colors) configured to emit colored light of various, different wavelength ranges (e.g., candlelight, dawn/dusk light, moonlight, sunny day light, and blue sky with sun). The guide 308 color mixes the colored light as it travels from the input port 306 of the guide 308 to the output port 312 of the guide 308 along the optical guide plane 310.

In one embodiment, one or more color sensors 1502 (see FIG. 15) are positioned within the luminaire providing a color signal 1402 to a driver/control board 1408. The color signal 1402 is indicative of the power of a narrow color spectrum or wavelength and/or intensity of light based on the type of color sensor selected. A driver circuit 1406 is responsive to the color signal to modify pulse width modulated (PWM) signals 1407 from the driver board 1408 driving the LEDs 302. The PWM signals are modified as a function of the intensity and/or wavelength of light being sensed as compared to a desired intensity or wavelength. Switches 1410 selected by an operator indicate to DMX control modules 1404 the mode of operation and specify the wavelength and/or intensity desired. The system is calibrated and programmed by a personal computer (PC) 1410 via an I-player interface 1414.

Figure 15:
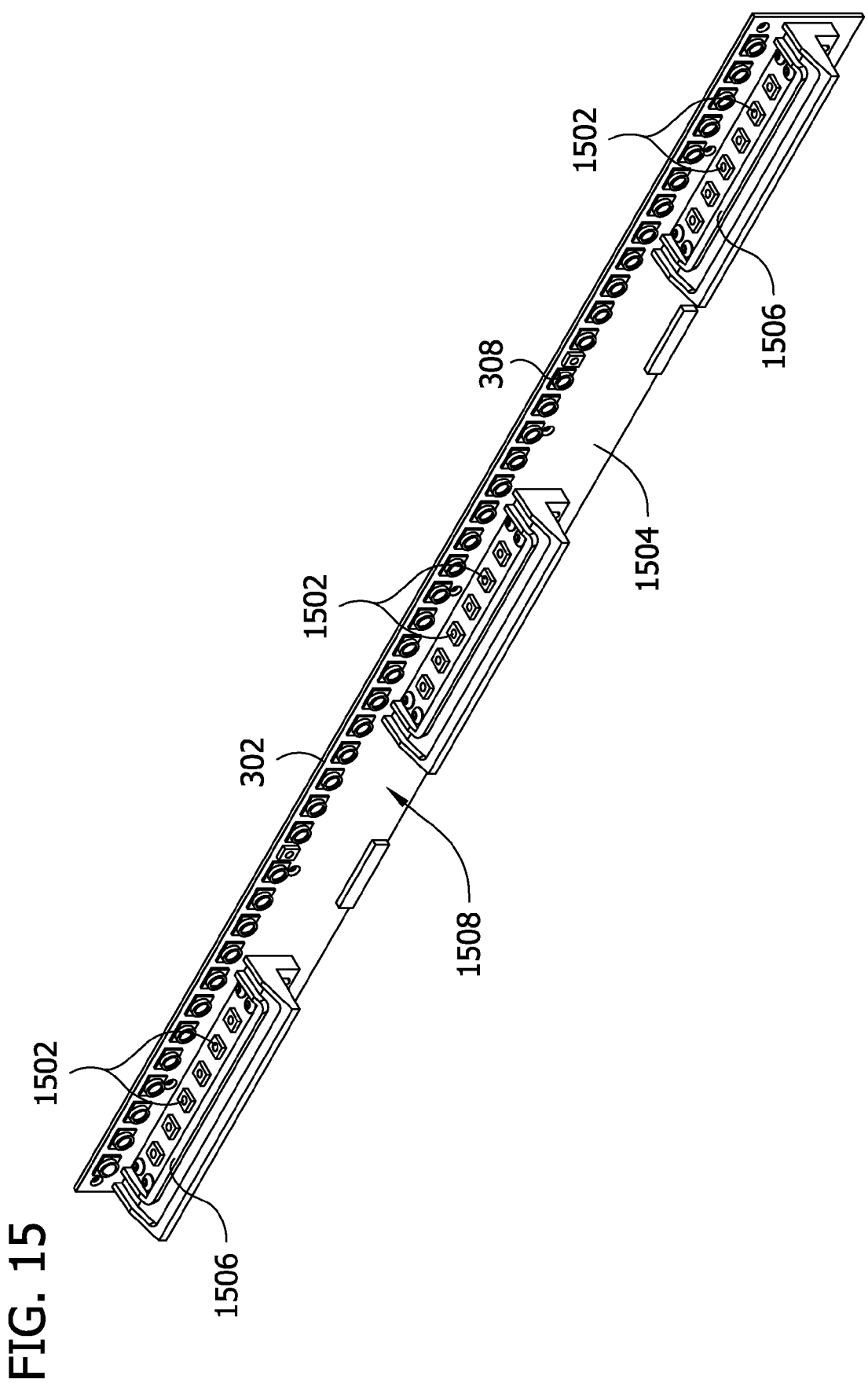
FIG. 15 is a top plan view of a linear, planar array of LEDs mounted on a printed circuit board, according to one embodiment of the invention.

FIG. 15 is a top plan view of a linear, planar array of LEDs 308 mounted on a printed circuit board 1504, according to one embodiment. As shown in FIG. 15, the color sensors 1502 may be mounted on a board 1506 which is perpendicularly mounted to the printed circuit board 1504. However, it is also contemplated that the color sensors 1502 may be located within the guide 308 and/or within the aperture 330. The color sensors 1502 may be positioned to detect back scatter or direct light to control color and/or intensity. Any number of color sensors 1502 may be employed to provide any level of accuracy or detection needed. The color sensors 1502 can detect a specific color band of the LED or LEDs it senses and can be used in conjunction with control electronics and an algorithm to detect and control the color shift and light flux change of the LED or LEDs.

As illustrated in FIG. 15, 42 LEDs 308 are used in one embodiment. The following Table 16 illustrates one configuration of the LEDs.

TABLE 16

| S. No. | String No. | String Subset | Color | Current (mA) | No. of LED | Driver Power Dissipation (W) |
|---|---|---|---|---|---|---|
| 1 | 1 | 1A | Cool White | 700 | 5 | 6 |
| 2 |   | 1B | Cool White | 700 | 4 | 7 (4.3 + 2.8) |
| 3 | 2 | 2A | Cool White | 700 | 5 | 6 |
| 4 | 3 | 3A | Green | 700 | 4 | 6 |
| 5 |   | 3B | Green | 700 | 3 | 9 (5.6 + 3.4) |
| 6 | 4 | 4A | Red | 700 | 7 | 7 (3.5 + 3.5) |
| 7 | 5 | 5A | Amber | 350 | 7 | 4 |
| 8 | 6 | 6A | Amber | 350 | 7 | 4 |

More LEDs and/or LED colors may be employed to depict a wider color gamut. Also, an optional white mask 1508 may be applied to the surface of PCB 1504 to reflect light. For example, when using 4 different LED colors, the mixture may be cool white, red, green, and amber colored LEDs. When using 5 different LED colors, the mixture may be cool white, red, green, amber, and blue colored LEDs. In one embodiment, the driver circuit 1406 and other electronics are separated from LEDs 302.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that several advantages of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A luminaire comprising:
    an output aperture having an input port and an output port defining an aperture light path, the output aperture having a top and a bottom which are not parallel to each other;
    a radiation guide having an input port and an output port and having an optical guide plane extending from the input port to the output port; and
    an array of LEDs located at the input port of the radiation guide such that light emitted by the LEDs is transmitted into the radiation guide;
    wherein the input port of the aperture operatively connects to the output port of the radiation guide and is positioned adjacent thereto such that a cross section of the output aperture is asymmetrical relative to the optical guide plane, and wherein the output aperture has parallel sides and a rectangular cross section perpendicular to the aperture light path and perpendicular to the optical guide plane extending through the aperture.

2. The luminaire of claim 1 wherein the optical guide plane is curved from the input port of the guide to the output port of the guide.

3. The luminaire of claim 1 wherein the LEDs emit colored light of various, different wavelength ranges, and wherein the radiation guide color mixes the colored light as it travels from the input port of the radiation guide to the output port of the radiation guide along the optical guide plane to eliminate or to minimize contrast of the color shadows created by multiple LEDs.

4. The luminaire of claim 1 further comprising a driver circuit for driving the array of LEDs with pulse width modulated signals of varying duty cycle to emit different light outputs from the output port of the output aperture.

5. The luminaire of claim 4 further comprising a color sensor positioned within or adjacent the luminaire, the color sensor providing a color signal to the driver circuit indicative of wavelength and/or intensity of light, the driver circuit responsive to the color signal to modify the pulse width modulated signals as a function thereof.

6. The luminaire of claim 1 further comprising a diffuser positioned such that at least some of the light output from the output port of the output aperture is transmitted by the diffuser.

7. The luminaire of claim 1 wherein the array of LEDs is a planar, linear array, and wherein the guide has parallel sides and has a top and a bottom parallel to each other, the guide having a rectangular cross section perpendicular to the optical guide plane.

8. The luminaire of claim 1 further comprising:
a control lens, wherein the control lens is positioned along the aperture light path or within the radiation guide.

9. The luminaire of claim 8, wherein the control lens is a collimating lens.

10. A luminaire comprising:
an output aperture having an input port and an output port defining an aperture light path, the output aperture having a top and a bottom which form an angle relative to each other;
a radiation guide having an input port and an output port and having an optical guide plane extending from the input port to the output port; and
an array of LEDs located at the input port of the radiation guide such that light emitted by the LEDs is transmitted into the radiation guide;
wherein the input port of the aperture operatively connects to the output port of the radiation guide and is positioned adjacent thereto and wherein the output port of the output aperture is offset from the input port of the output aperture relative to the optical guide plane, and wherein the output aperture has parallel sides and a rectangular cross section perpendicular to the aperture light path and perpendicular to the optical guide plane extending through the aperture.

11. The luminaire of claim 10 wherein the offset defines an acute angle.

12. The luminaire of claim 10 wherein the guide has a non-planar top parallel to a non-planar bottom such that the optical guide plane is curved from the input port of the guide to the output port of the guide.

13. The luminaire of claim 10 wherein the LEDs emit colored light of various, different wavelength ranges, and wherein the radiation guide color mixes the colored light as it travels from the input port of the radiation guide to the output port of the radiation guide along the optical guide plane to eliminate or to drastically reduce contrast of the color shadows created by multiple LEDs.

14. The luminaire of claim 10 further comprising a driver circuit for driving the LEDs with pulse width modulated signals of varying duty cycle to emit different light outputs from the output port of the output aperture.

15. The luminaire of claim 14 further comprising a color sensor positioned within or adjacent the luminaire, the color sensor providing a color signal to the driver circuit indicative of wavelength and/or intensity of light, the driver circuit responsive to the color signal to modify the pulse width modulated signals as a function thereof.

16. The luminaire of claim 10 further comprising a diffuser positioned such that at least some of the light output from the output port of the output aperture is transmitted by the diffuser.

17. The luminaire of claim 10 wherein the array of LEDs is a planar, linear array, and wherein the radiation guide has parallel sides and has a top and a bottom parallel to each other, the radiation guide having a rectangular cross section perpendicular to the optical guide plane.

18. The luminaire of claim 10, further comprising:
a control lens, wherein the control lens is positioned along the aperture light path or within the radiation guide.

19. The luminaire of claim 18, wherein the control lens is a collimating lens.

20. A luminaire comprising:
an output aperture having an input port and an output port;
a radiation guide having an input port and an output port; and
an array of LEDs located at the input port of the radiation guide such that light emitted by the LEDs is transmitted into the radiation guide;
wherein the input port of the aperture operatively connects to the output port of the radiation guide and is positioned adjacent thereto such that a central plane of the output aperture is asymmetric relative to a central plane of the radiation guide, and wherein the output aperture has parallel sides and a rectangular cross section perpendicular to the aperture light path and perpendicular to the optical guide plane extending through the aperture.

21. The luminaire of claim 20 wherein the output port of the aperture is larger than the input port of the aperture to form an asymmetrical beam of light.

22. The luminaire of claim 20 wherein the LEDs emit colored light of various, different wavelength ranges, and wherein the radiation guide color mixes the colored light as it travels from the input port of the radiation guide to the output port of the radiation guide along the optical guide plane to eliminate or to drastically reduce contrast of the color shadows created by multiple LEDs.

23. The luminaire of claim 20 further comprising a driver circuit for driving the LEDs with pulse width modulated signals of varying duty cycle to emit different light outputs from the output port of the output aperture.

24. The luminaire of claim 23 further comprising a color sensor positioned within or adjacent the luminaire, the color sensor providing a color signal to the driver circuit indicative of wavelength and/or intensity of light, the driver circuit responsive to the color signal to modify the pulse width modulated signals as a function thereof.

25. The luminaire of claim 20 further comprising a diffuser positioned such that at least some of the light output from the output port of the output aperture is transmitted by the diffuser.

26. The luminaire of claim 20 wherein the array of LEDs is a planar, linear array, and wherein the radiation guide has parallel sides and has a top and a bottom parallel to each other, the radiation guide having a rectangular cross section perpendicular to the optical guide plane.

27. The luminaire of claim 20, further comprising:
a control lens, wherein the control lens is positioned along the aperture light path or within the radiation guide.

28. The luminaire of claim 27, wherein the control lens is a collimating lens.

* * * * *